United States Patent
Nakayama

(10) Patent No.: US 10,107,339 B2
(45) Date of Patent: Oct. 23, 2018

(54) CLUTCH RELEASE BEARING DEVICE

(71) Applicant: Mitsuhiro Nakayama, Shizuoka (JP)

(72) Inventor: Mitsuhiro Nakayama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 238 days.

(21) Appl. No.: 14/905,370

(22) PCT Filed: Jun. 30, 2014

(86) PCT No.: PCT/JP2014/067331
§ 371 (c)(1),
(2) Date: Jan. 15, 2016

(87) PCT Pub. No.: WO2015/015976
PCT Pub. Date: Feb. 5, 2015

(65) Prior Publication Data
US 2016/0153505 A1    Jun. 2, 2016

(30) Foreign Application Priority Data

Jul. 29, 2013   (JP) ................................. 2013-156711

(51) Int. Cl.
*F16D 23/14*   (2006.01)
*F16C 35/073*   (2006.01)
*F16C 19/06*   (2006.01)

(52) U.S. Cl.
CPC .......... *F16D 23/143* (2013.01); *F16C 35/073* (2013.01); *F16D 23/14* (2013.01);
(Continued)

(58) Field of Classification Search
None
See application file for complete search history.

(56) References Cited

U.S. PATENT DOCUMENTS 3,882,979 A * 5/1975 Limbacher .............. F16D 23/14
192/110 B
3,998,507 A * 12/1976 Tune ....................... F16C 19/10
192/98

(Continued)

FOREIGN PATENT DOCUMENTS

DE   7 016 580    10/1971
EP   0 164 947    12/1985

(Continued)

OTHER PUBLICATIONS

Extended European Search Report dated Apr. 28, 2017 in corresponding European Application No. 14831413.1.

(Continued)

*Primary Examiner* — Colby M Hansen
(74) *Attorney, Agent, or Firm* — Wenderoth, Lind & Ponack, L.L.P.

(57) ABSTRACT

In a clutch release bearing device, an inner ring (12) of a ball bearing (10) is pressed against a diaphragm spring (40) so that a clutch is disengaged. A contact member (20) made of steel is press-fitted to the inner ring (12) so that a convex spherical protruding portion (20b) formed at an end portion of the contact member (20) is brought into contact with the diaphragm spring (40). In addition, a contact position (C) between the protruding portion (20b) and the diaphragm spring (40) is located between an extension line of an inner diameter (D1) of the inner ring (12) and an extension line of an outer diameter (D2) of the inner ring (12).

4 Claims, 5 Drawing Sheets

(52) U.S. Cl.
CPC ............ *F16D 23/145* (2013.01); *F16C 19/06* (2013.01); *F16C 2361/43* (2013.01)

(56) References Cited

U.S. PATENT DOCUMENTS

| | | | |
|---|---|---|---|
| 4,252,225 A | | 2/1981 | Breward et al. |
| 4,399,899 A | | 8/1983 | Breward et al. |
| 4,555,007 A | * | 11/1985 | Harrington ............ F16D 23/14 192/110 B |
| 4,566,578 A | | 1/1986 | Leigh-Monstevens et al. |
| 4,653,626 A | * | 3/1987 | Limbacher ............ F16D 23/14 192/110 B |
| 4,742,902 A | | 5/1988 | Leigh-Monstevens |
| 4,771,874 A | | 9/1988 | Leigh-Monstevens |
| 4,969,755 A | | 11/1990 | Parzefall |
| 5,261,528 A | * | 11/1993 | Bouchal ................ B65G 39/09 193/37 |
| 6,287,014 B1 | * | 9/2001 | Salla ..................... B65G 39/09 193/37 |
| 6,338,576 B1 | * | 1/2002 | Girardin ................ G01P 3/443 324/207.25 |
| 6,595,695 B1 | * | 7/2003 | Goto ................... F16C 33/7853 384/482 |

FOREIGN PATENT DOCUMENTS

| | | |
|---|---|---|
| EP | 0 194 376 | 9/1986 |
| EP | 0 321 757 | 6/1989 |
| FR | 2 131 185 | 11/1972 |
| FR | 2 225 652 | 11/1974 |
| FR | 2 553 846 | 4/1985 |
| JP | 56-120815 | 9/1981 |
| JP | 61-6032 | 1/1986 |
| JP | 61-148926 | 9/1986 |
| JP | 62-80313 | 4/1987 |
| JP | 1-203720 | 8/1989 |
| JP | 2-146317 | 6/1990 |
| JP | 9-177827 | 7/1997 |
| JP | 2008-51182 | 3/2008 |
| JP | 2009-299813 | 12/2009 |
| JP | 2010-19296 | 1/2010 |
| JP | 2010-156446 | 7/2010 |
| JP | 2012-163172 | 8/2012 |

OTHER PUBLICATIONS

International Preliminary Report on Patentability and Written Opinion of the International Searching Authority dated Feb. 2, 2016 in the International Application No. PCT/JP2014/067331.

International Search Report dated Sep. 16, 2014 in International (PCT) Application No. PCT/JP2014/067331.

* cited by examiner ured, and power from the engine is transmitted. When the diaphragm spring is pressed, the clutch disc is separated from the flywheel, and the clutch is disengaged. A clutch release bearing device functions to press the diaphragm spring in order to disengage the clutch.

CLUTCH RELEASE BEARING DEVICE

TECHNICAL FIELD

The present invention relates to a clutch release bearing device in a clutch mechanism for automobiles.

BACKGROUND ART

A clutch mechanism for automobiles is arranged between an engine and a transmission, and functions to transmit or interrupt output from the engine to the transmission and successive drive train components. In a manual transmission (MT), a flywheel is arranged on the engine side, a pressure plate is arranged on the transmission side, and a clutch disc having friction materials attached thereto is arranged therebetween. A diaphragm spring generates a spring force so as to cause the pressure plate to press the clutch disc against the flywheel. With this, a frictional force is generated, and power from the engine is transmitted. When the diaphragm spring is pressed, the clutch disc is separated from the flywheel, and the clutch is disengaged. A clutch release bearing device functions to press the diaphragm spring in order to disengage the clutch.

As illustrated in FIG. 7, a clutch release bearing device, which is collectively represented by the reference symbol "A", is slid along a front cover 34 by a release fork 32 interlocked with a clutch pedal (not shown). The front cover 34 is mounted to a clutch case 36 of the transmission, and an input shaft 38 of the transmission passes therethrough. Normally, the clutch release bearing device A is separated from a diaphragm spring 40, and the diaphragm spring 40 functions to cause a pressure plate 42 to press a clutch disc 44 against a flywheel 46 so that a clutch is engaged. In this state, when the clutch pedal is depressed, the release fork 32 pivots in a counterclockwise direction in FIG. 7 so as to press the clutch release bearing device A against the diaphragm spring 40. With this, the diaphragm spring 40 is deflected, and the pressure plate 42 is separated from the clutch disc 44. In this way, the clutch is disengaged.

The clutch release bearing device A mainly includes a sleeve configured to slide along the front cover 34 in an axial direction, a ball bearing mounted to an outer periphery of the sleeve, a cover configured to integrally hold an outer ring of the ball bearing and the sleeve, and an elastic member interposed between the outer ring and the cover. The cover has a part configured to be hooked by the release fork 32. Then, when the clutch ball release bearing device A is moved toward the diaphragm spring 40 with the release fork 32, an inner ring of the ball bearing is pressed against the diaphragm spring 40, and is rotated together with the diaphragm spring 40 (inner ring rotating type).

In Patent Literature 1, there is disclosed a clutch release bearing device in which a separate contact member is press-fitted to the inner ring of the ball bearing, and the contact member is brought into contact with the diaphragm spring. In Patent Literature 2, there is disclosed a clutch release bearing device in which the inner ring of the ball bearing and the contact member are integrally formed of a steel plate. Note that, in each of the clutch release bearing devices, a contact position between the contact member and the diaphragm spring is arranged on a radially outer side with respect to an outer periphery of the inner ring.

CITATION LIST

Patent Literature 1: JP 02-146317 A
Patent Literature 2: JP 2010-156446 A

SUMMARY OF INVENTION

Technical Problem

When the contact member is formed of a steel plate, the steel plate is poor in rigidity, and hence there is a problem of breakage of the contact member. Further, in the case where the contact position between the contact member and the diaphragm spring is located on the radially outer side with respect to the outer periphery of the inner ring, when a load is applied from the diaphragm spring to the inner ring, a force is generated in a direction of inclining the inner ring. As a result, a state of the contact is disturbed. Abnormal noise is liable to be generated in the disturbed contact state. Further, as an area of the contact becomes larger, the abnormal noise is more liable to be generated. In addition, as described in Patent Literature 2, when the inner ring is formed only of the steel plate by press working, sealing performance of the bearing may be degraded, for example, in a case where the contact part is flexed.

It is a main object of the present invention to solve the problems as described above, specifically, to provide a clutch release ball bearing capable of preventing breakage of a contact member and generation of abnormal noise while maintaining sealing performance.

Solution to Problem

According to the present invention, in order to solve the problems, the contact member is made of steel, and a contact position between the contact member and a diaphragm spring in a radial direction is located between an extension line of an inner diameter of an inner ring and an extension line of an outer diameter of the inner ring.

Specifically, according to one embodiment of the present invention, there is provided a clutch release bearing device, comprising:
  a ball bearing;
  a contact member configured to be held in contact with a diaphragm spring;
  a cover configured to hold an outer ring of the ball bearing; and
  an elastic member interposed between a bent portion of the cover and an end surface of the outer ring,
  the ball bearing comprising:
    an inner ring having a raceway along an outer periphery thereof;
    the outer ring having a raceway along an inner periphery thereof;
    balls interposed between the inner ring and the outer ring;
    a cage configured to hold the balls at predetermined intervals in a circumferential direction of the cage; and
    a sealing device configured to seal a space between the inner ring and the outer ring,
  wherein the contact member is made of steel, and comprises:
    a cylindrical portion; and
    a protruding portion formed at an end portion on one side of the cylindrical portion,
  wherein the cylindrical portion is configured to be press-fitted to an inner periphery of the inner ring,
  wherein the protruding portion comprises an end portion having a convex circular-arc shape in cross-section, and has an outer diameter that is larger than an outer diameter of the cylindrical portion, and
  wherein a contact position between the protruding portion and the diaphragm spring is arranged between an extension line of an inner diameter of the inner ring and an extension line of an outer diameter of the inner ring.

The contact position between the contact member and the diaphragm spring is located between the extension line of the inner diameter of the inner ring and the extension line of the outer diameter of the inner ring. With this, a force of inclining the inner ring is not applied, and hence a state of the contact with the diaphragm spring is stabilized. As a result, an unnecessarily great force is not applied to the sealing device, and hence stable sealing performance is maintained. Further, the contact member is configured to be held in contact with the diaphragm spring at the protruding portion having the convex circular-arc shape in cross-section. With this, a straight line and a convex circular arc are held in contact with each other in cross-section. As a result, an area of the contact is reduced, and hence generation of abnormal noise can be suppressed or prevented.

Advantageous Effects of Invention

As described above, according to the one embodiment of the present invention, it is possible to provide the clutch release ball bearing capable of preventing the breakage of the contact member and the generation of the abnormal noise while maintaining the sealing performance. In particular, the contact position between the contact member and the diaphragm spring is located within a width corresponding to an axially extended thickness of the inner ring, and is located on a radially inner side of the ball bearing with respect to centers of the balls. Thus, movement of the inner ring due to a load applied from the diaphragm spring is stabilized. With this, the state of the contact can be stabilized while maintaining the sealing performance.

DESCRIPTION OF EMBODIMENTS

Now, description is made of an embodiment of the present invention with reference to the accompanying drawings.

Figure 1:
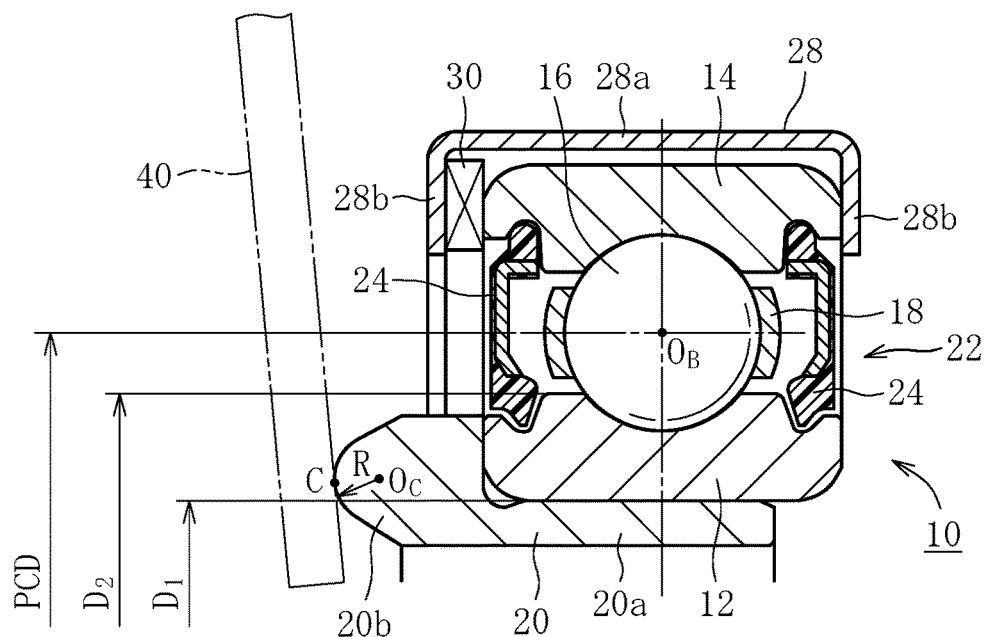
FIG. 1 is a sectional view for illustrating a clutch release bearing device according to an embodiment of the present invention.

A clutch release bearing device illustrated in FIG. 1 comprises a ball bearing 10, a contact member 20, a cover 28, and an elastic member 30.

The ball bearing 10 comprises, as main components, an inner ring 12, an outer ring 14, balls 16, a cage 18, and sealing devices 22, and is used in an inner ring rotating configuration. In other words, normally, the contact member 20 is kept out of contact with a diaphragm spring 40 (clutch is disengaged). When the clutch is engaged, the contact member 20 is pressed against the diaphragm spring 40 rotated in conjunction with a flywheel of an engine. With this, the contact member 20 and the inner ring 12 are rotated in conjunction with the diaphragm spring 40.

The inner ring 12 has a raceway along an outer periphery thereof, and the outer ring 14 has a raceway along an inner periphery thereof. The plurality of balls 16 are interposed between the raceway of the inner ring 12 and the raceway of the outer ring 14. The cage 18 has a function to hold the balls 16 at predetermined intervals in a circumferential direction. In this way, the ball bearing 10 has the same basic configuration as those of normal ball bearings, and hence those normal bearings may be employed as the ball bearing 10. For example, a deep groove ball bearing and an angular contact ball bearing may be employed.

The contact member 20 overall has a substantially cylindrical external shape, and comprises a cylindrical portion 20a and a protruding portion 20b. The cylindrical portion 20a is press-fitted to an inner periphery of the inner ring 12. The protruding portion 20b is formed at an end portion of the cylindrical portion 20a on one side in an axial direction. The protruding portion 20b is located on an outer side with respect to an end surface of the inner ring 12, and has an outer diameter larger than an inner diameter of the inner ring 12. The protruding portion 20b has a function to position the contact member 20 in the axial direction by being brought into abutment against the end surface of the inner ring 12. The protruding portion 20b of the contact member 20 is configured to be held in contact with the diaphragm spring 40 indicated by the two-dot chain line. Thus, a state in which the protruding portion 20b is located at "the end portion on the one side in the axial direction" refers to a state in which the protruding portion 20b is located at an end portion on the diaphragm spring 40 side (also referred to as "front side").

As illustrated in FIG. 1, an end portion of the protruding portion 20b of the contact member 20 has a convex circular-arc shape in cross-section. The reference symbol $O_C$ represents a curvature center of the circular arc, and the reference symbol R represents a curvature radius of the circular arc. Through formation of the protruding portion 20b, an area of contact with the diaphragm spring 40 can be reduced, a position of the contact can be stabilized, and generation of abnormal noise can be suppressed. As specific examples of the curvature radius R, from a viewpoint of workability, it is preferred that a lower limit of the curvature radius R be set to 1 mm, more preferably, 1.5 mm, and an upper limit of the curvature radius R be set to 3 mm.

The reference symbol C in FIG. 1 represents a contact position between the contact member 20 and the diaphragm spring 40. Further, a position of the contact position C in a radial direction of the bearing is located between an extension line of an inner diameter D1 of the inner ring 12 and an extension line of an outer diameter D2 of the inner ring 12. With this, the contact member 20 is allowed to receive a load from the diaphragm spring 40 through intermediation of the end surface of the inner ring 12.

Further, the curvature center $O_C$ of the circular arc of the protruding portion 20b is located within a range of a thickness of the inner ring 12, specifically, between the inner diameter D1 of the inner ring and the outer diameter D2 of the inner ring. With this, the contact member 20 is allowed to receive the load from the diaphragm spring 40 on the inner ring 12 side with respect to a center $O_B$ of the ball 16, that is, on a radially inner side of the bearing. In addition, the load to be applied from the diaphragm spring 40 to the contact member 20 can be borne within the range of the thickness of the inner ring 12, specifically, by the high-rigidity end surface of the inner ring, which is advantageous in terms of strength.

The contact member 20 is made of steel, and it is preferred that the contact member 20 be subjected to lathing, grinding, and then heat treatment to form a hardened layer at least on a surface of the protruding portion 20b. Specifically, it is preferred that a hardness of the hardened layer be set to range from 58 HRC to 64 HRC. Further, at least on the surface of the protruding portion 20b, there may be formed a solid lubricating coating instead of the hardened layer or in addition to the hardened layer.

Figure 2:
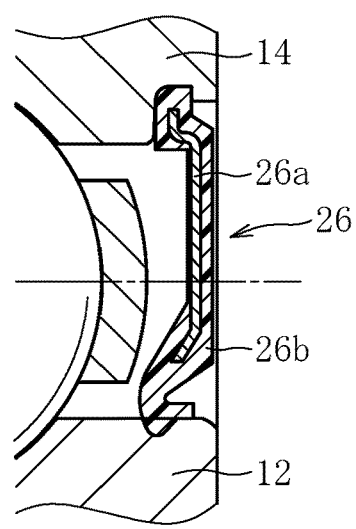
FIG. 2 is a partial enlarged view for illustrating a ball bearing of FIG. 1.

As described above, the contact position C between the contact member 20 and the diaphragm spring 40 is stabilized, and sealing performance is enhanced. However, in order to more reliably maintain the sealing performance, the sealing devices 22 may be mounted to both sides of the ball bearing 10. The sealing devices 22 may be of a non-contact type or a contact type. FIG. 1 is an illustration of an example of the non-contact type. Specifically, outer rims of non-contact seals 24 are fitted respectively into annular grooves formed in an inner peripheral surface of the outer ring 14, to thereby form labyrinths respectively between inner rims of the non-contact seals 24 and lateral walls of annular grooves formed along the inner ring 12. FIG. 2 is an illustration of an example of the contact type, specifically, an example of using a contact seal 26 comprising a metal core 26a and an abrasion-prone rubber 26b. An outer rim of the contact seal 26 is fitted into the annular groove of the outer ring 14, and an inner rim of the abrasion-prone rubber 26b is held in elastic contact with a shoulder surface of the inner ring 12. Note that, FIG. 2 is an illustration of an initial state prior to elastic deformation of the abrasion-prone rubber 26b. The abrasion-prone rubber refers to a rubber material that is easily abraded. However, there may be employed not only a rubber, but also a synthetic resin, a solid lubricant, a non-woven fabric, and a mild steel (refer to Japanese Patent Application Laid-open No. 2010-19296).

Figure 6:
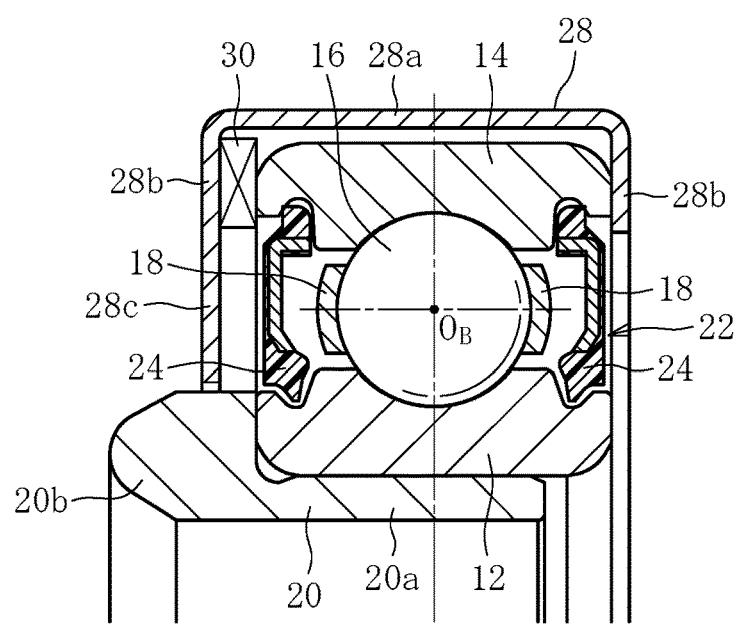
FIG. 6 is a sectional view for illustrating the modification of the clutch release bearing device.
Figure 7:
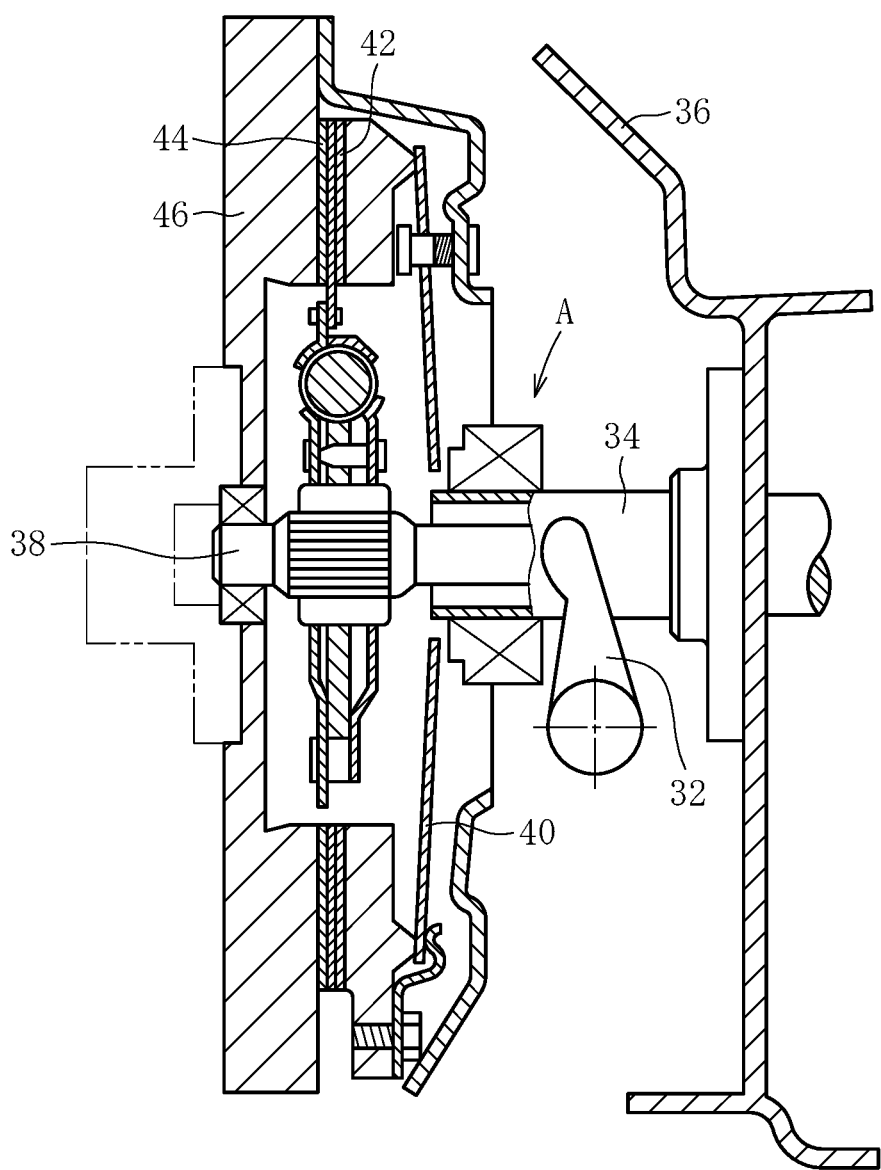
FIG. 7 is a sectional view for illustrating a clutch release device.

Further, as illustrated in FIG. 6, a bent portion 28b of the cover 28 on the front side may be extended to the radially inner side to form a labyrinth between an inner rim of an extended portion 28c and an outer peripheral surface of the protruding portion 20b of the contact member 20. With this, an inner and outer dual sealing structure can be obtained cooperatively with the sealing device 22 on an inner side (contact seal 24 or non-contact seal 26). The contact member 20 comes into contact with the diaphragm spring 40, and the contact member 20 slides along the front cover (refer to FIG. 7). Thus, in an atmosphere of the clutch release bearing device A, abrasive dust is liable to be generated. In addition, during travel or washing of an automobile, water on a road surface or on a lower side of a vehicle body may scatter onto the clutch release bearing device A. In view of this, employment of the dual sealing structure as described above is advantageous in terms of dust resistance and water resistance.

The embodiment of the present invention is described with reference to the drawings, but various modifications may be made to the present invention without departing from the scope of claims. For example, the cage 18 may comprise a steel cage, and a resin crown-shaped cage.

Figure 3A:
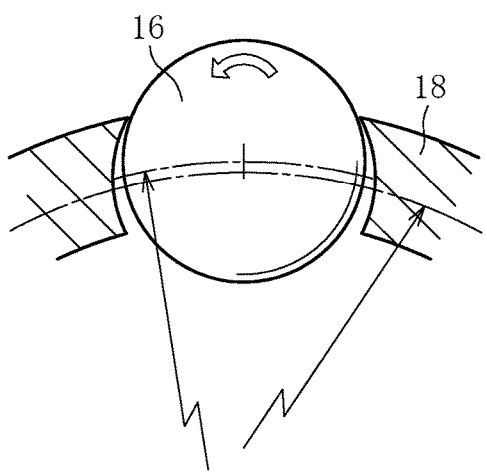
FIG. 3A is a partial enlarged sectional view for illustrating a cage according to the embodiment.
Figure 3B:
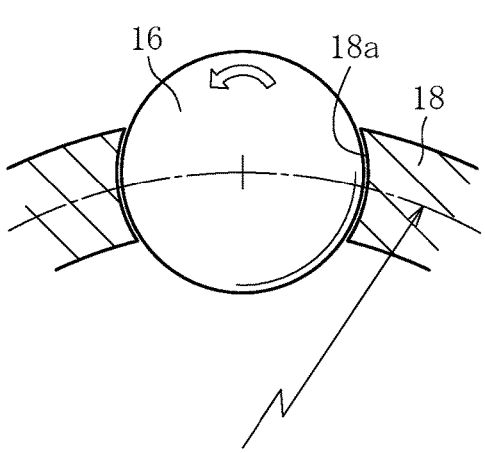
FIG. 3B is a partial enlarged sectional view for illustrating a related-art cage.

FIG. 3A to FIG. 3D are illustrations of examples of the resin crown-shaped cage of a low torque type, in which the related art and the examples are compared with each other. Specifically, as illustrated in FIG. 3B, hitherto, a PCD of the balls 16 and a PCD of pockets 18b of the cage 18 are generally set to be concentric with each other. In this case, on both the radially inner side and the radially outer side, gaps are formed between end portions of the pocket 18b and the ball 16. Thus, only a small amount of grease adhering to the ball 16 is scraped off by the cage, and hence a large amount of the grease adheres to the ball 16.

Meanwhile, as illustrated in FIG. 3A, when the PCD of the pockets 18b of the cage 18 is set smaller than the PCD of the balls 16 so that the ball 16 is wrapped with the end portion of the pocket 18b on the radially outer side, the grease adhering to the ball 16 is more easily scrapped off. Thus, the amount of the grease adhering to the ball 16 is reduced. In contrast to the radially outer side, the gap between the end portion of the pocket 18b on the radially inner side and the ball 16 is large, and hence the grease is difficult to be scraped off. The grease also tends to be moved from the radially inner side to the radially outer side by action of a centrifugal force generated along with rotation of the bearing. Thus, in order to reduce the amount of the grease adhering to the ball, it is effective to scrape off the grease adhering to the ball 16 on the radially outer side.

Figure 3C:
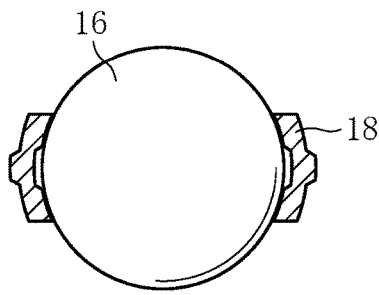
FIG. 3C is a partial enlarged sectional view for illustrating the cage according to the embodiment, which comprises a ball non-contact portion.
Figure 3D:
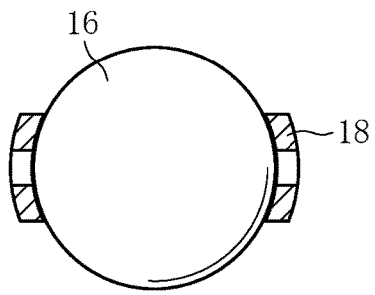
FIG. 3D is a partial enlarged sectional view for illustrating the cage according to the embodiment, which comprises a ball non-contact portion.
Figure 4A:
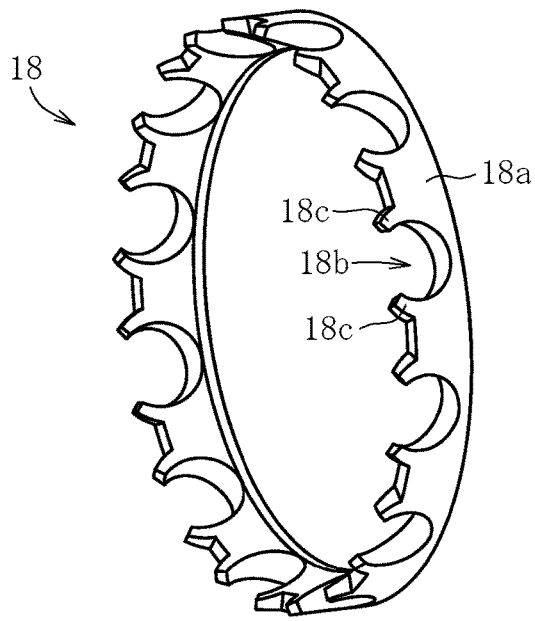
FIG. 4A is a perspective view for illustrating a crown-shaped cage.
Figure 4B:
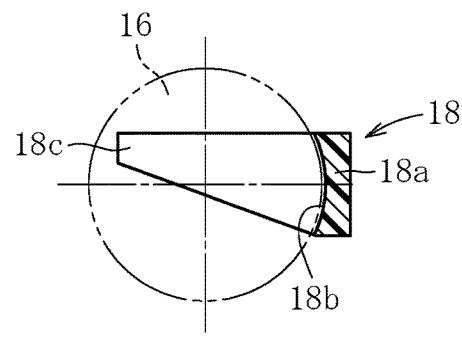
FIG. 4B is a partial sectional view for illustrating the crown-shaped cage of FIG. 4A.
Figure 4C:
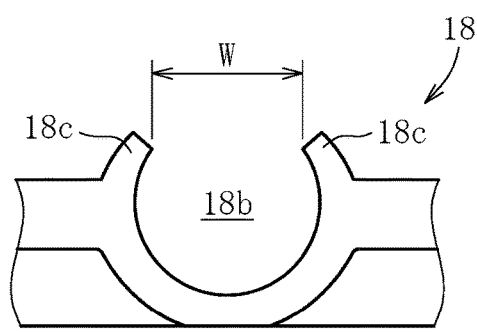
FIG. 4C is a partial plan view for illustrating the crown-shaped cage of FIG. 4A.
Figure 4D:
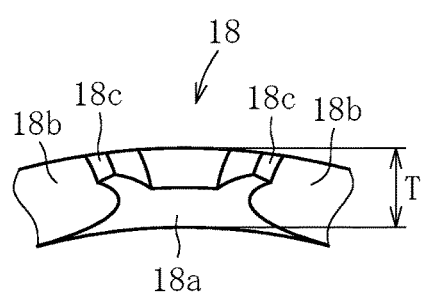
FIG. 4D is a partial side view for illustrating the crown-shaped cage of FIG. 4A.

Further, in the low torque type, as illustrated in FIG. 3C and FIG. 3D, a ball non-contact portion may be formed in an inner wall surface of the pocket configured to receive the ball 16. As examples of modes of the ball non-contact portion, there are given a recessed portion formed along the inner wall surface of the pocket (FIG. 3C), and slits formed through lateral walls of the pocket (FIG. 3D). In each of the modes, on the inner wall surface of the pocket, an area of a region of contact with the ball is reduced. With this, torque can be reduced. This is not only because a resistance generated when a lubricant flows in the pocket is reduced, but also because an amount of an oil film formed between the ball and the inner wall surface of the pocket is reduced. In Japanese Patent Application Laid-open No. 2009-299813, there is described an example of the low torque type.

FIG. 4A to FIG. 4D are illustrations of an example of the resin crown-shaped cage of a high speed type. As specific examples of the resin, there may be employed polyamides such as PA66, PA46, and PA9T. The resin cage is lightweight, and hence is suited to high speed rotation. Meanwhile, there is a problem of deformation due to the action of the centrifugal force along with high speed rotation. The high speed type is devised to solve such a problem. Note that, an example of the high speed type is described in Japanese Patent Application Laid-open No. 2012-163172.

In the cage 18, the pockets 18b are equiangularly formed in an annular proximal portion 18a. Each of the pockets 18b has an opening formed on the one side in the axial direction, and prongs 18c are formed on both sides of the opening in the circumferential direction. As understood from FIG. 4A and FIG. 4C, a separation distance between the pair of prongs 18c corresponds to a width W of the opening. As clearly understood from FIG. 4B, an inner peripheral surface of each of the prongs 18c is formed into an obliquely cut shape so as to be thinned as approaching to a distal end of the prong 18c. In other words, the inner peripheral surface of the cage 18 is formed into a partially conical surface shape. The reference symbol T (FIG. 4D) represents a thickness of the cage 18 in the radial direction. A mass of the cage 18 is reduced by an amount corresponding to the cut parts, and hence deformation of the cage 18 due to the centrifugal force along with high speed rotation is suppressed.

In the clutch release bearing device, as illustrated in FIG. 1, the cover 28 is arranged on an outside of the outer ring 14. The cover 28 comprises a cylindrical part 28a, and the flat plate parts 28b bent radially inward from both ends of the cylindrical part 28a in the axial direction. Further, the elastic member 30 such as a corrugated washer is interposed between the flat plate part 28b on the front side, that is, on the diaphragm spring 40 side, and an end surface of the outer ring 14. The elastic member 30 functions to cause the outer ring 14 to be held in the axial direction and to be movable in the radial direction, that is, maintain the outer ring 14 in what is called a floating state. As a result, a self-alignment effect is exerted. Specifically, when an axial center on an engine side and an axial center on a transmission side are misaligned with each other, the ball bearing 10 is moved in the radial direction by an amount corresponding to the misalignment, to thereby automatically eliminate the misalignment of the axial centers.

Figure 5:
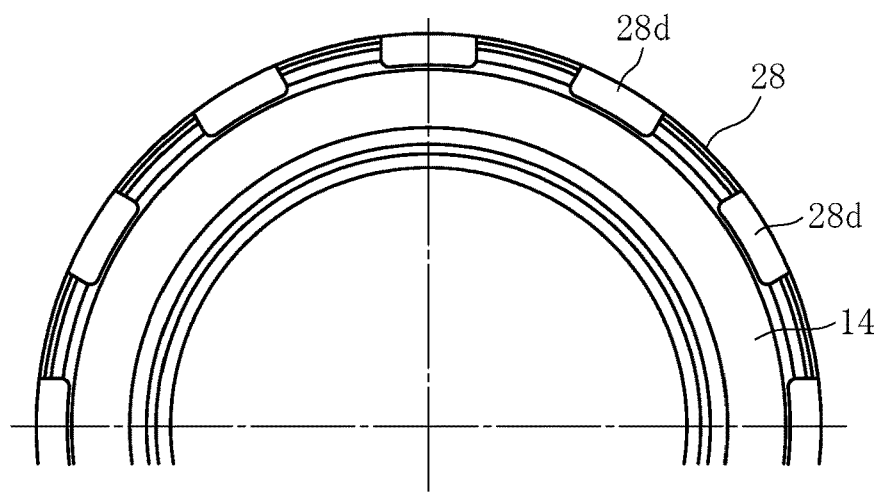
FIG. 5 is a side view for illustrating a modification of the clutch release bearing device.

FIG. 5 is an illustration of an example in which the cover 28 is formed of a steel plate, and three or more claws 28d are formed equiangularly instead of the flat plate part 28b on a side opposite to the side where the elastic member 30 is arranged so that the cover 28 is fixed by snap-fitting the claws 28d. Note that, on the side where the elastic member 30 is arranged, the flat plate part 28b of the cover 28 is bent radially inward over its entire circumference. Thus, on the side opposite to the side where the elastic member 30 is arranged, when the plurality of claws 28d extending in the axial direction are formed in advance instead of the flat plate part 28b formed over the entire circumference, and when the claws 28d are snap-fitted to the end surface of the outer ring 14 under a state in which the elastic member 30 and the outer ring 14 are inserted in the cover 28, assembly work of those three components can be easily performed.

When the corrugated washer formed of a steel plate is employed as the elastic member 30, in order to prevent abrasion, it is preferred that a surface of the cover 28, which comes into contact with the elastic member 30, be subjected to solid lubricant coating treatment. As the elastic member 30, a disc spring and a synthetic resin may also be employed. The synthetic resin in this case is a type of a sliding bearing configured to support a thrust load. As an example, there may be given "BEAREE ER3201" manufactured by NTN Corporation. The "BEAREE ER3201" is an elastomer-based elastic fluororesin sliding member, and is sometimes called "slippery rubber" for its characteristics.

REFERENCE SIGNS LIST

A clutch release bearing device
10 ball bearing
12 inner ring
14 outer ring
16 ball
18 cage
20 contact member
20a cylindrical portion
20b protruding portion
22 sealing device
24 non-contact seal
26 contact seal
  26a metal core
  26b abrasion-prone rubber
28 cover
28a disc portion
28b bent portion
28c extended portion
28d claw
30 elastic member
32 release fork
34 front cover
36 clutch case
38 input shaft
40 diaphragm spring
42 pressure plate
44 clutch disc
46 flywheel

The invention claimed is:

1. A clutch release bearing device of an inner ring rotating type, the clutch release bearing device comprising:
   a ball bearing comprising:
      an inner ring having a raceway along an outer periphery thereof;
      an outer ring having a raceway along an inner periphery thereof;
      balls interposed between the inner ring and the outer ring;
      a cage configured to hold the balls at predetermined intervals in a circumferential direction of the cage; and
      a sealing device configured to seal a space between the inner ring and the outer ring;
   a contact member configured to be held in contact with a diaphragm spring;
   a cover configured to hold the outer ring of the ball bearing; and
   an elastic member interposed between the cover and the outer ring,
   wherein the contact member is formed separately from the inner ring, is made of steel, has a cylindrical shape, and comprises:
      a cylindrical portion configured to be press-fitted to an inner periphery of the inner ring; and
      a protruding portion formed at an end portion on one side of the cylindrical portion,
   wherein an end portion of the protruding portion that contacts the diaphragm spring has a convex circular-arc shape in cross-section, and another end portion of the protruding portion is in contact with an end face of the inner ring,
   wherein the contact member is positioned in the axial direction by the other end portion of the protruding portion being against the end face of the inner ring,
   wherein the protruding portion has an outer diameter that is larger than an outer diameter of the cylindrical portion, and is smaller than the outer diameter of the inner ring, and
   wherein a contact position between the protruding portion and the diaphragm spring is arranged between an extension line of an inner diameter of the inner ring and an extension line of an outer diameter of the inner ring.

2. The clutch release bearing device according to claim 1, wherein the protruding portion has a hardened layer formed on a surface thereof, the hardened layer having a hardness of from 58 HRC to 64 HRC.

3. The clutch release bearing device according to claim 1, wherein the protruding portion has a solid lubricating coating formed on the surface thereof.

4. The clutch release bearing device according to claim 1, wherein the sealing device comprises a labyrinth seal formed between the cover and an outer peripheral surface of the contact member.

* * * * *